United States Patent [19]

Tanaka et al.

[11] Patent Number: 5,714,540
[45] Date of Patent: Feb. 3, 1998

[54] ESTERIFIED, POLYVINYL ESTER-GRAFTED STARCH

[75] Inventors: Hideyuki Tanaka; Isamu Utsue, both of Aichi; Yasuhito Okumura, Chiba; Tetsuya Kawamatsu; Hiroshi Tanaka, both of Aichi, all of Japan

[73] Assignee: Japan Corn Starch Co., Ltd., Aichi, Japan

[21] Appl. No.: 606,933

[22] Filed: Feb. 26, 1996

[30] Foreign Application Priority Data

Mar. 3, 1995 [JP] Japan ................................. 7-044487

[51] Int. Cl.$^6$ ................................................. C08L 3/00
[52] U.S. Cl. ........................ 525/54.24; 525/54.31; 527/300; 527/304; 536/107; 536/110; 536/115; 536/119; 536/126
[58] Field of Search ............... 525/54.24, 54.31; 527/300, 304; 536/107, 110, 115, 119, 126

[56] References Cited

U.S. PATENT DOCUMENTS

| | | | |
|---|---|---|---|
| 3,795,670 | 3/1974 | Mark et al. | 536/107 |
| 4,891,404 | 1/1990 | Narayan et al. | 525/54.2 |
| 5,367,067 | 11/1994 | Frische et al. | 536/45 |
| 5,462,983 | 10/1995 | Bloembergen et al. | 524/51 |

FOREIGN PATENT DOCUMENTS

| | | |
|---|---|---|
| WO 92/16583 | 10/1992 | WIPO . |
| WO 93/20110 | 10/1993 | WIPO . |
| WO 94/07953 | 4/1994 | WIPO . |

OTHER PUBLICATIONS

A. M. Mark and C. L. Mehltretter, Die Starke 22, Jahrg, 1970/Nr. 4 (pp. 108–110).

A. M. Mark and C. L. Mehltretter, Die Starke 24, Jahrg, 1972/Nr. 3 (pp. 73–76).

Journal of Applied Polymer Sciences, vol. 22, 1978 (pp. 459–465). "A New Biodegradable Plastic Made From Starch Graft Poly (methyl acrylate) Copolymer".

*Primary Examiner*—Nathan M. Nutter
*Attorney, Agent, or Firm*—Quarles & Brady

[57] ABSTRACT

A starch derivative which, when incorporated with no or only a little plasticizer, yields moldings having good flexibility, toughness, and water-relating properties for practical use comprises an esterified, polyvinyl ester-grafted starch derivative which is formed by esterifying starch and grafting starch with a polyvinyl ester. The polyvinyl ester is derived from one or more saturated or unsaturated aliphatic acids or aromatic carboxylic acids having 2 to 18 carbon atoms.

4 Claims, No Drawings

ESTERIFIED, POLYVINYL ESTER-GRAFTED STARCH

FIELD OF THE INVENTION

The present invention relates to new esterified, polyvinyl ester-grafted starch derivatives, a process for synthesis thereof, and biodegradable thermoplastic resin composition containing an esterified, polyvinyl ester-grafted starch derivative.

BACKGROUND OF THE INVENTION

Because of the concerns with environmental protection, active development works are proceeding in the field of bio-degradable plastics (thermoplastic resin compositions). Noticeable among them are those which are based on starch derivatives, such as highly esterified starch and vinyl-grafted starch. The former is disclosed in U.S. Pat. No. 5,367,067 and PCT/US92/02003, and the latter is reported in "A New Biodegradable Plastic Made from Starch Graft Poly(methyl acrylate) Copolymer" (Journal of Applied Polymer Science, vol. 22, 459–465, 1978) and Japanese Patent laid open H5-12510. These references do not directly affect the novelty of the present invention.

As far as the present inventors know, no biodegradable plastics based on starch derivatives have been put to practical use and put on the market. A probable reason for this is that the prior art starch derivatives formed by esterifying or vinyl grafting do not yield products (including sheet, film, and foam) having satisfactory physical properties. That is, the products are brittle and lack toughness necessary for practical use. For the products to have sufficient toughness and flexibility, it is necessary to incorporate into the raw material a large amount of plasticizer (which decreases strength and promotes deterioration with the passage of time). In addition, the products are so susceptible to moisture and water that they cannot be used in application areas where good water resistance, moisture resistance, water repellence, and water vapor permeability are required.

SUMMARY OF THE INVENTION

It is an object of the present invention to provide new starch derivatives and thermoplastic resin compositions made therefrom, which, when incorporated with no or only a little plasticizer, yield products having good flexibility, toughness, and water-related properties for practical use.

It is another object of the present invention to provide a process for synthesis of such starch derivatives.

The present invention relates to esterified, polyvinyl ester-grafted starch derivatives which are made from starch by both esterifying and polyvinyl ester grafting. The esterification involves the introduction of acyl groups of one or more saturated or unsaturated aliphatic acids or aromatic carboxylic acids having 2 to 18 carbon atoms and the polyvinyl ester-grafting involves the grafting of polyvinyl esters of one or more saturated or unsaturated aliphatic acids or aromatic carboxylic acids having 2 to 18 carbon atoms onto the starch moluclue.

The process of the present invention for the synthesis of the esterified, polyvinyl ester-grafted starch derivatives comprises reacting starch with a vinyl ester (as an esterifying agent) in a nonaqueous organic solvent with the aid of an esterifying catalyst, thereby performing the esterification, and/or reacting starch with a vinyl ester (as a grafting agent), thereby performing the grafting by radical polymerization.

The biodegradable thermoplastic resin compositions of the present invention comprise a base polymer and an optional adjuvant. The base polymer can be composed entirely of one or more of the esterified, polyvinyl ester-grafted starch derivatives of the present invention or of one or more of the starch derivatives of the present invention and an additional polymer. The optional adjuvant can be a biodegradable plasticizer and/or filler.

DETAILED DESCRIPTION OF THE PREFERRED EMBODIMENTS

The esterified, polyvinyl ester-grafted starch derivatives of the present invention may be represented by the structural formula shown below.

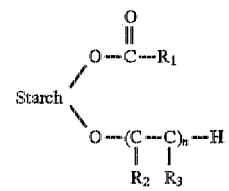

In this formula, starch residue can contain the hydroxyl group unreacted; where, starch is the residue of a starch molecule; $R_1$ is any of alkyl groups, alkenyl groups, and aryl groups having 1 to 17 carbon atoms (preferably 1 to 7 carbon atoms); $R_2$ is hydrogen or an alkyl group; $R_3$ is $OCOR_4$ or $COOR_4$; and $R_4$ is any of an alkyl group, an alkenyl group, and an aryl group having 1 to 17 carbon atoms (preferably 1 to 7 atoms) and n is less than 2500.

The alkyl groups represented by $R_1$ and $R_4$ may be exemplified by methyl, ethyl, propyl, butyl, octyl, dodecyl, and stearyl. The alkenyl groups represented by $R_1$ and $R_4$ may be exemplified by acryl, hexenyl, and octenyl. The aryl groups represented by $R_1$ and $R_4$ may be exemplified by benzyl, p-toluyl, and xylyl. Preferred alkyl groups include methyl, ethyl, and propyl.

By the term "degree of substitution (DS) by esterification" is meant in this specification the average number of the hydroxyl groups on a starch molecule. "DS=3" means 100% blocking.

According to the present invention, the degree of substitution (DS) by esterification should be 0.1 to 2.8 (preferably 0.5 to 2.5), and the grafting ratio of polyvinyl ester should be lower than 50 wt %, (preferably 5 to 45 wt %).

With a value of DS smaller than 0.1, the modified starch is improved only a little in physical properties such as moisture absorption and moldability. With a value of DS greater than 2.8, the modified starch is slow in biodegradation. With a grafting ratio in excess of 50 wt %, the modified starch is slow in biodegradation.

The esterified, polyvinyl ester-grafted starch derivatives may be prepared by any process which is not specifically restricted. A preferred process of the present invention, comprises first reacting starch with a vinyl ester, as an esterifying agent, in a nonaqueous organic solvent with the aid of an esterifying catalyst, thereby performing the esterification, and then reacting the starch ester with a vinyl ester, as a grafting agent, thereby effecting the grafting by radical polymerization.

The raw starch for use in the process includes the following:

(a) Corn starch, high-amylose corn starch, wheat starch, and other unmodified starches originating from terrestrial stems;

(b) Potato starch, tapioca starch, and other unmodified starches originating from subterranean stems; and (c) Slightly modified starches prepared from the above-mentioned starches by esterification, etherification, oxidation, acid treatment, and dextrinizing.

These raw starches may be used alone or in combination with one another.

The order of esterifying and grafting is immaterial. The grafting may be followed by esterifying, or esterifying may be followed by grafting. It is also possible to perform grafting on a commercial esterified starch or to perform esterifying on a commercial vinyl ester-grafted starch by using a vinyl ester as an agent. The grafting may be accomplished by coupling.

It is also possible to perform esterifying and grafting by reacting starch with a vinyl ester (as an esterifying and grafting reagent) in the presence of water. In other words, grafting in an aqueous dispersion medium can be followed by esterifying continuously without dehydration, washing, and drying. (See Example 6.)

The vinyl ester used for esterifying is one in which the ester group has 2 to 18 carbon atoms (preferably 2 to 7 carbon atoms). One or more vinyl esters can be used alone or in combination with one another. Any vinyl ester in which the ester group has more than 18 carbon atoms is high in yields of reagent utilization but poor in reaction efficiency. Any vinyl ester in which the ester group has 2 to 7 carbon atoms is desirable because of its high reaction efficiency (70% or above).

Typical examples of the vinyl esters are given below. Of these examples, vinyl acetate and vinyl propionate are desirable because of their high reaction efficiency. (The parenthesized number indicates the number of carbon atoms in the ester group.)

The preferred esters are:
(a) Vinyl esters of saturated aliphatic acids, such as vinyl acetate (C2), vinyl propionate (C3), vinyl butanoate (C4), vinyl caproate (C6), vinyl caprylate (C8), vinyl laurate (C12), vinyl palmitate (C16), and vinyl stearate (C18).
(b) Vinyl esters of unsaturated aliphatic acids, such as vinyl acrylate (C3), vinyl crotonate (C4), vinyl isocrotonate (C4), and vinyl oleate (C18).
(c) Vinyl esters of aromatic carboxylic acids, such as vinyl benzoate and vinyl p-methylbenzoate.

In one embodiment of the present invention, the nonaqueous organic solvent is a vinyl ester. This embodiment obviates the necessity of solvent recovery in the purification step. Incidentally, this mode of reaction is not employed in the conventional esterification with a vinyl ester.

This embodiment offers the advantage that the resulting product does not decrease in molecular weight and the reaction efficiency of vinyl ester is high. On the other hand, this embodiment suffers the disadvantage that the vinyl ester has to be used in the form of liquid (or heated melt) and the reaction is slightly uneven. The vinyl esters that can be used in this embodiment includes those exemplified above.

In another second embodiment of the present invention, the nonaqueous organic solvent is not a vinyl ester. In other words, the vinyl ester used as the esterifying agent is not used as the nonaqueous organic solvent.

The advantage of not using a vinyl ester as the nonaqueous organic solvent is that it is possible to readily control the reactant concentration and reaction rate regardless of the kind of the vinyl ester. Another advantage is that the reaction is more uniform than in the case where a vinyl ester is used as the nonaqueous organic solvent. However, there is a disadvantage in that the solvent has to be recovered after separation from the vinyl ester.

The nonaqueous organic solvent for use in the process may be selected from the following:
(a) Polar solvents, such as dimethyl sulfoxide (DMSO), dimethylformamide (DMF), and pyridine, which dissolve starch.
(b) Polar solvents, such as ethyl acetate and acetone, which do not dissolve starch but dissolve the vinyl ester and esterified starch (without reaction with vinyl ester). They may be used alone or in combination with one another.

Of these examples, DMSO, DMF, and pyridine are desirable from the standpoint of the efficiency and uniformity of their reaction.

The esterifying catalyst may be selected from any of the following three groups:
(a) Hydroxides and/or mineral acid salts or carbonates of metals in the first five periods of the Periodic Table.
(b) Organic phase transfer catalysts.
(c) Amino compounds.

Of these groups, the first one is desirable from the standpoint of reaction efficiency and catalyst cost.

Examples of each group are given below:
(a) Alkali metal hydroxides, such as sodium hydroxide, potassium hydroxide, and lithium hydroxide; alkali metal salts of organic acids, such as sodium acetate, sodium propionate, and sodium p-toluenesulfonate; hydroxides of alkaline earth metals, such as barium hydroxide and calcium hydroxide; alkaline earth metal salts of organic acids, such as calcium acetate, calcium propionate, and barium p-toluenesulfonate; salts of mineral acids, such as sodium phosphate, calcium phosphate, sodium bisulfite, sodium bicarbonate, and potassium sulfate; salts of acids of amphoteric metals or hydroxides of amphoteric metals, such as sodium aluminate, potassium zincate, aluminum hydroxide, and zinc hydroxide; and carbonates, such as sodium carbonate and potassium bicarbonate.
(b) Amino compounds, such as dimethylaminopyridine and diethylaminoacetic acid.
(c) Quaternary ammonium compounds, such as N-trimethyl-N-propyl ammonium chloride and N-tetraethylammonium chloride.

In a preferred embodiment of the invention, the catalyst is previously impregnated into the starch so as to improve the reaction efficiency in the case where the reaction is carried out in a vinyl ester as the medium or the reaction is carried out in a nonaqueous solvent which does not dissolve starch.

There are several methods for impregnation. One method consists of dipping raw starch in an aqueous solution or solvent containing the catalyst. Another method consists of mixing raw starch with an aqueous solution or solvent containing the catalyst using a mixing apparatus such as kneader. Still another method consists of pregelatinizing raw starch using a drum dryer or the like together with an aqueous solution or solvent containing the catalyst, and a final method consists of gelatinizing raw starch using a batch cooker or continuous cooker together with an aqueous solution or solvent containing the catalyst.

The esterification may be carried out at any temperature which is not specifically restricted. The reaction temperature is usually about 30° to about 200° C., and preferably about 60° to about 150° C. for better efficiency. The conventional reaction that employs an acid anhydride is carried out at 40° C. or below so that starch will not decrease in molecular weight (due to hydrolysis). By contrast, the preferred esterification reaction that employs a vinyl ester can be carried out at higher temperatures because it gives no acid as the by-product. This leads to higher efficiency.

Vinyl ester as the esterifying agent should be used in amount of about 1 to about 20 moles, preferably about 3 to about 7 moles, per mole of raw starch.

The amount of the esterifying catalyst should usually be about 1 to about 30% of the anhydrous starch by weight.

Vinyl ester also can be used as the grafting agent. In addition, acrylate esters and methacrylate esters may also be used as the grafting agent.

The grafting by radical polymerization may be accomplished before or after the esterifying. Alternatively, grafting may be performed on a commercial esterified starch having an adequate degree of substitution.

The mode of radical polymerization is not specifically restricted. Some examples are given below:

(a) Bulk polymerization that employs vinyl ester monomer (as the grafting agent) as the solvent.
(b) Solution polymerization that is carried out in the nonaqueous organic solvent used for esterifying.
(c) Suspension polymerization that is carried out in water.

Polymerization should be carried out under the conditions which are similar to those under which grafting is usually performed on starch.

In the case of bulk polymerization, starch is uniformly mixed with monomer by using a homogenizer or the like, and then the mixture is heated and given an initiator to carry out polymerization.

In the case of solution polymerization, starch is gelatinized at 85° C. in DMSO and monomer is added to the DMSO solution. After heating, the mixture is given an initiator to carry out polymerization.

In the case of suspension polymerization, starch is made into an aqueous slurry of adequate concentration, and the slurry is emulsified with monomer and an emulsifier by using a homogenizer. After heating, the emulsion is given an initiator to carry out polymerization.

The initiator for radical polymerization is not specifically restricted. It may be selected from alkali persulfates, dialkyl peroxides, and azo compounds. Initiators for bulk polymerization include potassium persulfate, ammonium persulfate, and hydrogen peroxide. Initiators for solution polymerization include benzoyl peroxide, azobisisobutyronitrile, and ammonium persulfate. Initiators for suspension polymerization include ceric ammonium nitrate, cumene hydroperoxide, and peracetic acid. Of these examples, potassium persulfate, ammonium persulfate, hydrogen peroxide, and ceric ammonium nitrate are desirable. The amount of the initiator is usually 0.1% to 20.0% of monomer by weight.

The initiator for radical polymerization should preferably be used in combination with a cocatalyst. The cocatalyst may be a hydroxide and/or mineral acid salt or carbonate of a metal in the first five periods in the Periodic Table. The amount of the cocatalyst is usually 0.1% to 20.0% of monomer.

The biodegradable thermoplastic resin compositions of the present invention are comprised of a base polymer and an optional adjuvant, said base polymer being composed entirely or partly of the esterified, polyvinyl ester-grafted starch derivatives of the present invention, and the optional adjuvant which can be a biodegradable plasticizer and/or filler. The amount of the esterified, polyvinyl ester-grafted starch in the base polymer can be 5 to 100 wt %, preferably 25 to 100 wt % of the base polymer. The amount of the plasticizer is usually 0–60 phr (parts per hundred), preferably less than 30 phr. The amount of the filler is usually 0–200 phr, preferably 0–150 phr.

When the base polymer is composed of the esterified, polyvinyl ester-grafted starch and an additional polymer, the latter should be one or more members selected from the group consisting of esterified and/or etherified starch derivatives, biodegradable polyesters, cellulose derivatives, polyvinyl alcohol, and polyvinyl esters. Other examples of the additional polymer include polycondensation products such as polyamides, polycarbonates, polyurethanes, and vinyl polymers (excluding polyvinyl ester), polyolefins, polyalkylene oxides, biodegradable polyalkylene oxides, ethylene-vinyl acetate copolymers, ethylene-ethyl acrylate copolymers, ethylene-methyl acrylate copolymers, ABS resins, and styrene-acrylonitrile copolymers.

Specific examples of these polymers are given below:

(a) Biodegradable polyesters including polycaprolactone, polylactic acid, polyadipate, polyhydroxybutyrate, Polyhydroxybutyrate-valeate, etc.
(b) Cellulose derivatives including cellulose acetate, hydroxyalkylcellulose, carboxyalkylcellulose, etc.
(c) Polyvinyl esters including polyvinyl acetate, polyacrylonitrile, polyvinyl carbazole, polyacrylate ester, polymethacrylate ester, etc.
(d) Polyolefins including polyethylene, polyisobutylene, polypropylene, etc.
(e) Vinyl polymers (excluding polyvinyl ester) including vinyl chloride, polystyrene, etc.
(f) Polyalkylene oxides including polyethylene oxide, polypropylene oxide, etc.

The biodegradable plasticizer may be one or more members selected from phthalate ester, aromatic carboxylate ester, aliphatic dibasic acid ester, aliphatic ester derivative, phosphate ester, polyester plasticizer, epoxy plasticizer, and polymeric plasticizer.

Specific examples of these plasticizers are given below:

(a) Phthalate esters including dimethyl phthalate, diethyl phthalate, dibutyl phthalate, dioctyl phthalate, ethylphthalyl ethyl glycolate, ethylphthalyl butyl glycolate, etc.
(b) Aliphatic dibasic acid esters including butyl oleate, glycerin monooleate ester, butyl adipate, n-hexyl adipate, etc.
(c) Aromatic carboxylate esters including trioctyl trimellitate, diethylene glycol benzoate, octyl oxybenzoate, etc.
(d) Aliphatic ester derivatives including sucrose octaacetate, diethylene glycol dibenzoate oxyacid ester, methyl acetylrecinolate, triethyl acetylcitrate, triacetin, tripropionin, diacetylglycerin, glycerin monostearate, etc.
(e) Phosphate esters including tributyl phosphate, triphenyl phosphate, etc.
(f) Epoxy plasticizers including epoxidized soybean oil, epoxidized castor oil, alkylepoxy stearate, etc.
(g) Polymeric plasticizers including liquid rubbers, terpenes, linear polyester, etc.

The filler may be one or more members selected from synthetic and natural inorganic fillers and organic fillers.

Specific examples of the fillers are given below:

(a) Inorganic fillers including talc, titanium oxide, clay, chalk, limestone, calcium carbonate, mica, glass, diatomaceous earth, wollastonite, silicates, magnesium salt, manganese salt, glass fiber, ceramic powder, etc.
(b) Organic fillers including powdered cellulosic fiber (and derivatives thereof), wood powder, pulp, pecan fiber, cotton powder, hulls, cotton linter, wood fiber, bagasse, etc.

The esterified, polyvinyl ester-grafted starch derivatives and the thermoplastic resin compositions of the present invention are useful in a broad range of application areas as follows:

(a) Film and sheet formed by extrusion, casting, rolling, inflation, etc.
(b) Lamination and coating on paper, sheet, film, non-woven fabric, etc.
(c) Additives to be incorporated into paper during paper-making processes to impart special functions to paper and paper products.
(d) Additives to be incorporated into non-woven fabric during manufacturing processes to impart special functions to non-woven fabrics and their products.
(e) Aqueous emulsions.
(f) Products, such as solid or cellular moldings, which can be produced by injection molding, extrusion molding, blow molding, transfer molding, compression molding, etc.

The present invention provides novel esterified, grafted-starch derivatives, a process for synthesis thereof, and thermoplastic resin compositions containing said starch derivatives. As demonstrated in the following examples, the resin compositions produce products having properties good impact resistance and flexibility for practical use in both dry and wet states even though no or only a little plasticizer is used.

The novel thermoplastic resin compositions have the following desirable properties:

(1) The moldings have an elongation in elastic limit greater than 10%.
(2) The moldings have improved water vapor transmission.
(3) The thermoplastic resin composition has good flexibility which makes it possible to produce film without plasticizer or with only a little plasticizer.
(4) The resin composition retains plasticizer very well.
(5) The resin composition accepts a large amount (up to 50%) of inexpensive mineral filler (such as talk and calcium carbonate) without adverse effect on moldability.
(6) The resin composition yields injection molded items having a low flexural modulus and good flexibility.

In addition to the above-mentioned properties, the resulting products are still biodegradable.

It is believed that the above-mentioned effects arise from increased molecular weight, adequate crystallinity, polarity distribution, internal plasticizing, etc. The increased molecular weight is due to the acyl group (ester) introduced through the alcoholic hydroxyl groups of starch and the grafted polyvinyl ester. Another reason is the fact that the alcoholic hydroxyl groups of starch are blocked.

The invention will be understood more readily by reference to the following Examples and Comparative Examples; however, these examples are intended to illustrate the invention and are not to be construed to limit the scope of the invention. In the examples, "parts" means "parts by weight" unless otherwise indicated.

Preparation (synthesis) of esterified, polyvinyl ester-grafted starch.

EXAMPLE 1

An esterified, polyvinyl ester-grafted starch was prepared by first grafting with vinyl propionate monomer by solution polymerization and then esterifying. The reaction conditions and the amounts of each component are shown below:

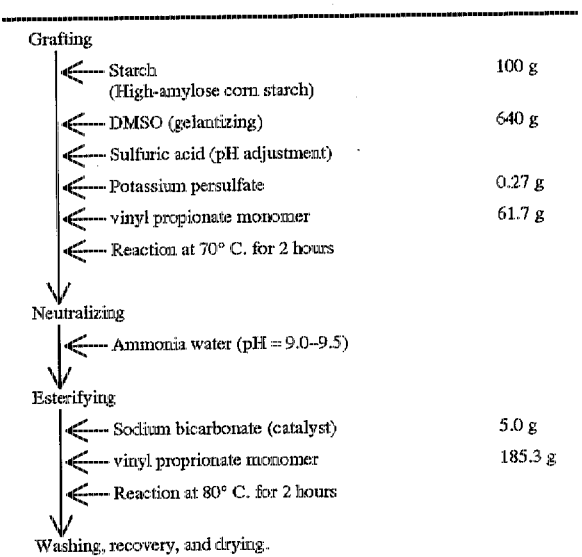

EXAMPLES 2 to 4

Esterified, polyvinyl ester-grafted starchs were prepared by grafting with vinyl acetate monomer by suspension polymerization and then esterifying. The reaction conditions and the amounts of each component are shown below:

| | Ex. 2 g | Ex. 3 g | Ex. 4 g |
|---|---|---|---|
| Grafting | | | |
| Starch (High-amylose corn starch) | 100 | 100 | 100 |
| Sodium lauryl sulfate (dispersing agent) | 0.5 | 2.0 | 4.0 |
| Tap water | 300 | 300 | 300 |
| Vinyl acetate monomer | 26.6 | 106.3 | 212.6 |
| Ceric ammonium nitrate (catalyst) | 5.1 | 5.1 | 5.1 |
| Reaction at 50° C. for 1 hour | | | |
| Dehydration, washing, and drying | | | |
| Esterifying | | | |
| Grafted Starch | 63.7 | 86.8 | 119.6 |
| DMSO (dissolution) | 350 | 350 | 350 |
| Sodium bicarbonate | 2.5 | 2.5 | 2.5 |
| vinyl acetate monomer | 79.7 | 79.7 | 79.7 |
| Washing, recovery, and drying. | | | |

EXAMPLE 5

An esterified, polyvinyl ester-grafted starch was prepared esterifying first and then grafting with vinyl acetate monomer by bulk polymerization. The reaction conditions and the amounts of each component are shown below:

```
Pretreatment
    ←── High-amylose corn starch        100 g
    ←── Sodium bicarbonate               25 g
    ←── Water                          31.3 g
    ↓
Esterifying
    ←── Vinyl acetate monomer        1062.8 g
    ↓
    Reaction at 65° C. for 4 hours
Grafting
    ←── Hydrogen peroxide
         (2 wt % 0f vinyl acetate)     21.3 g
    ←── Reaction at 65° C. for 4 hours
         (with water removal)
    ↓
Washing, recovery, and drying.
```

EXAMPLE 6

An esterified, polyvinyl ester-grafted starch was prepared by grafting and esterifying with vinyl acetate monomer in the presence of water. The reaction conditions and the amounts of each component are shown below:

```
Grafting
    ←── High-amylose corn starch         60 g
    ←── Water                           230 g
    ←── Vinyl acetate monomer          63.8 g
    ←── Potassium persulfate           0.64 g
    ←── Sodium bisulfite               0.64 g
         (with vinyl acetate refluxing at 72° C.)
    ↓
Esterifying
    ←── Sodium carbonate                 15 g
    ←── vinyl acetate monomer         159.4 g
    ←── Reaction for 4 hours
         (with vinyl acetate refluxing at 72° C.)
    ↓
Washing, recovery, and drying.
```

Comparative Example 1

An esterified starch was prepared by using vinyl propionate monomer. The reaction conditions and the amounts of each component are shown below:

```
Comparative Example 1 (Esterifying)
    ←── corn starch                     100 g
    ←── Sodium carbonate                 25 g
    ←── Vinyl acetate monomer        1062.8 g
    ←── Reaction at 65° C. for 4 hours
    ↓
Washing, recovery, and drying.
```

Comparative Example 2

A grafted starch was prepared by using vinyl acetate monomer by suspension polymerization. The reaction conditions and amounts of each component are shown below:

```
Comparative Example 2 (Grafting)
    ←── High-amylose corn starch        100 g
    ←── Sodium lauryl sulfate            25 g
    ←── Tap water                       350 g
    ←── Vinyl acetate monomer           167 g
    ←── Ceric ammonium nitrate          5.1 g
    ←── Reaction at 50° C. for 1 hour
    ↓
Washing, recovery, and drying.
```

The starch derivatives obtained in the above-mentioned examples and comparative examples were tested for the following items.

(1) Grafting ratio (by weight): Expressed in terms of the ratio of the amount of polyvinyl acetate added to the ether bond of the hydroxyl group of starch to the total amount.

(2) Homopolymer ratio (by weight): Expressed in terms of the ratio of the amount of the polyvinyl acetate homopolymer formed by competitive reaction during grafting to the total amount.

(3) Degree of substitution: Expressed in terms of the average number of the reactive hydroxyl groups at the positions 2, 3, and 6 on the glucose unit of starch which have been converted into ester bonds. The degree of substitution is expressed as 3 in the case of 100% substitution.

The results are shown in Table 1.

TABLE 1

|  | Example | | | | | | Comparative Example | |
|---|---|---|---|---|---|---|---|---|
|  | 1 | 2 | 3 | 4 | 5 | 6 | 1 | 2 |
| Grafted portion (wt %) | 12.2 | 15.4 | 24.4 | 19.7 | 4.9 | 17.0 | — | 18.0 |
| Homopolymer (wt %) | 8.5 | 6.1 | 18.0 | 38.5 | 15.5 | 35.9 | — | 28.7 |
| Acetylated portion (DS) | 1.63 | 1.91 | 1.34 | 0.87 | 1.66 | 0.94 | 2.2 | — |

TEST EXAMPLES

Test Example 1

Resin compositions were prepared from the samples of modified starches obtained in Example 3 and Comparative Examples 1 and 2. Each sample (100 parts) was incorporated with a plasticizer (ethylphthalyl ethylglycolate, EPEG for short) in an amount necessary for the resin compositions to exhibit almost the same level of tensile modulus as shown in Table 2.

Each resin composition was formed into dumbbell specimen (Type No. 1, small specimen), flexural specimen, disc specimen (conforming to JIS) by injection molding after extrusion at 130° C.

The specimens were tested for the following items according to the test methods indicated after the test item:

(1) Tensile modulus, tensile strength, elongation at break, and elongation in elastic limit: JIS K-7113.

(2) Dimensional change (shrinkage): The small specimen (Type No. 1) was measured for dimensions after conditioning at 40° C. and 75% RH for 96 hours. The dimensional change is expressed in terms of the ratio of dimensions measured before and after conditioning.

(3) Moisture absorption: The small specimen (Type No. 1) was measured for weight after conditioning at 23° C. and 75% RH for 96 hours. The moisture absorption is expressed in terms of the ratio of the weight increase to the weight of the specimen measured before conditioning.

(4) Water absorption: The small specimen (Type No. 1) was measured for weight after immersion in water at 20° C. for 24 hours. The water absorption is expressed in terms of the ratio of the weight increase (excluding surface water) to the weight of the specimen measured before immersion.

The results are shown in Table 2. It is noted that the specimen in Example 3, which is incorporated with a less amount of plasticizer, is comparable to the specimens in Comparative Examples 1 and 2 in tensile modulus. In addition, the former is by far superior to the latter in tensile strength and toughness and water-related properties (moisture absorption and water absorption). It is also noted that the sample in Example 3 gives moldings which have a smaller shrinkage.

The results of the tests are shown in Table 3. It is noted that the sample in Example 2 is by far superior to the samples in Comparative Examples 1 and 2 in water-related properties (water vapor transmission and water resistance) and the ability to retain the plasticizer.

TABLE 3

|  | Example 2 | Comparative Example 1 | Comparative Example 2 |
| --- | --- | --- | --- |
| Plasticizer (part) | 30 | 50 | 30 |
| Water vapor permeability (g/24 h·m²) | 250 | 960 | 680 |
| Water resistance (g/m²) | 4.5 | 4.9 | 10.5 |
| Flexural strength (cycles) |  |  |  |
| Condition A | 1000< | 78 | 210 |
| Condition B | 1000< | 34 | 126 |

Condition A: measured immediately after conditioning at 23° C. and 50% RH for 72 hours.
Condition B: measured after storage at 23° C. and 75% RH fpr 96 hours.

Test Example 3

Resin compositions were prepared from the samples of the starch derivatives obtained in Example 1 and Comparative Examples 1 and 2. Each sample (100 parts) was

TABLE 2

|  | Condition | Example 3 | Comparative Example 1 | Comparative Example 2 |
| --- | --- | --- | --- | --- |
| Plasticizer (parts) |  | 20 | 50 | 30 |
| Tensile Modulus | A | 5351 | 6315 | 7311 |
|  | B | 4620 | 4486 | 6407 |
|  | C | 4550 | 3980 | 5500 |
| Maximum tensile modulus (kg/cm²) | A | 156.5 | 123.7 | 123.5 |
|  | B | 115.8 | 83.0 | 101.7 |
|  | C | 109.1 | 48.5 | 62.0 |
| Elongation at break (%) | A | 64.0 | 30.4 | 9.3 |
|  | B | 61.3 | 39.2 | 11.5 |
|  | C | 60.5 | 25.1 | 12.1 |
| Elongation (%) | A | 21.0 | 3.0 | 5.0 |
|  | B | 20.0 | 4.0 | 5.0 |
|  | C | 20.0 | 4.0 | 4.5 |
| Shrinkage (%) | D | 0.05 | 36.9 | 11.5 |
| Moisture absorption (%) | B | 1.9 | 3.6 | 8.7 |
| Water absorption (%) |  | 2.0 | 5.8 | 12.5 |

Condition A: measured immediately after conditioning at 23° C. and 50% RH for 72 hours.
Condition B: measured after storage at 23° C. and 75% RH for 96 hours.
Condition C: measured after storage at 40° C. and 85% RH fpr 96 hours.
Condition D: measured after storage at 40° C. and 75% RH fpr 96 hours.

Test Example 2

Resin compositions were prepared from the samples of modified starches obtained in Example 2 and Comparative Examples 1 and 2. Each sample (100 parts) was incorporated with a plasticizer (EPEG) in an amount necessary for the resulting films to exhibit almost the same level of elongation as shown in Table 3.

Each resin composition was made into 30 micron thick film by extrusion at 130° C. This film was laminated by heat sealing onto double-bleached kraft paper (with a basis weight of 125 g/m2). The resulting laminate paper was tested for the following items according to the test method specified.

(1) Water vapor transmission rate . . . JIS Z0208
(2) Water resistance . . . (Cobb test for 60 min) JIS P8140
(3) Flexural strength . . . JIS P8114 (This is a measure to indicate the ability of the film to retain the plasticizer.)

incorporated with a plasticizer (triacetin) and a filler in an amount shown in Table 4.

The resulting resin composition was made into test specimens (conforming to JIS K7203) by injection molding under the following conditions. The specimens were tested for flexural strength and flexural modulus.

Molding conditions: temperature . . . 165° C., injection pressure . . . primary (65%), secondary (35%), tertiary (30%), injection molding machine . . . PS-40 made by Nissei Jushi Kogyo Co., Ltd.

The results of the tests are shown in Table 4. It is noted that the sample in Example 1 can accept more inorganic filler than the samples in Comparative Examples 1 and 2 and that the former has a lower flexural modulus and lower stiffness than the latter when the same amount of filler is incorporated.

TABLE 4

|  | Example 1 | Comparative Example 1 | Comparative Example 2 |
|---|---|---|---|
| Plasticizer (part) | 10 | 10 | 10 |
| Flexural strength |  |  |  |
| Talc: 30 | 365.6 | 536.8 | 498.5 |
| Talc: 50 | 501.5 | not moldable | not moldable |
| Flexural modulus |  |  |  |
| Talc: 30 | 20338 | 59417 | 55789 |
| Talc: 50 | 54322 | — | — |

Test Example 4

Resin compositions were prepared from the samples of the starch derivatives obtained in Example 4 and Comparative Example 1. Each sample (1 g) was mixed with 10 g of shale soil. The mixture was given water so that the maximum water capacity was 60%. The sample was tested for biodegradability by measuring the amount of carbon dioxide gas evolved from the sample by decomposition at 25° C.

The results of the tests are shown in Table 5. It is noted that the sample in Example 4 is comparable in biodegradability to that in Comparative Example 1.

TABLE 5

| Amount of carbon dioxide gas evolved (ml) | Example 1 | Comparative Example 1 |
|---|---|---|
| After 4 hours | 3.8 | 4.4 |
| After 12 hours | 12.4 | 14.7 |
| After 24 hours | 17.8 | 22.4 |

Test Example 5

The samples of the starch derivatives obtained in Example 4 and Comparative Example 1 were tested for glass transition point by using Shimadzu heat flux differential scanning calorimeter (DSC-50) under the following conditions. Sample: 8.600 mg, cell: aluminum, gas: nitrogen, flow rate: 50.00 mL/min, heating rate: 10° C./min, hold temperature: 220° C.

The test results are shown in Table 6. It is noted that the sample in Example 1 has a lower glass transition temperature than that in Comparative Example 1 (177.86°–184.31° C.). This suggests that the former can be molded without plasticizer.

TABLE 6

|  |  | Example 4 | Comparative Example 1 |
|---|---|---|---|
| On-set | 1 | 11.99°C. |  |
|  | 2 | 39.38°C. |  |
|  | 3 | 99.92°C. |  |
|  | 4 | 164.47°C. | 177.86° C. |
| End-set | 1 | 18.66°C. |  |
|  | 2 | 43.58°C. |  |
|  | 3 | 137.64°C. |  |
|  | 4 | 172.48°C. | 184.31° C. |

On-set: temperature at which transition begins.
End-set: temperature at which transition complete.

We claim:

1. An esterified, polyvinyl ester-grafted starch derivative having the following formula:

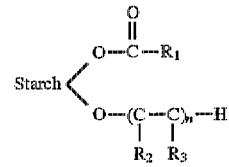

in which starch is the residue of a starch molecule which can contain unreacted hydroxyl groups; $R_1$ is a member selected from the group consisting of an alkyl group, an alkenyl group and an aryl group all having 1 to 17 carbon atoms; $R_2$ is hydrogen or an alkyl group; $R_3$ is $OCOR_4$ or $COOR_4$; $R_4$ is any of an alkyl group, an alkenyl group, and an aryl group having 1 to 17 carbon atoms, and n is greater than 1 and less than 2500.

2. An esterified, polyvinyl ester-grafted starch derivative of claim 1 in which $R_1$ and $R_4$ have 1 to 7 carbon atoms.

3. The esterified, polyvinyl ester-grafted starch as claimed in claim 1, wherein the esterification is in such a state that the degree of substitution (DS) is 0.1 to 2.8 and the graft ratio of said polyvinyl ester is lower than 50 wt %.

4. A biodegradable product containing, at least in part, an esterified, polyvinyl ester-grafted starch derivative of claim 1.

* * * * *